UNITED STATES PATENT OFFICE.

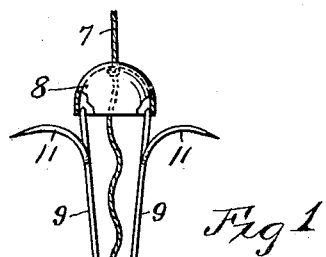
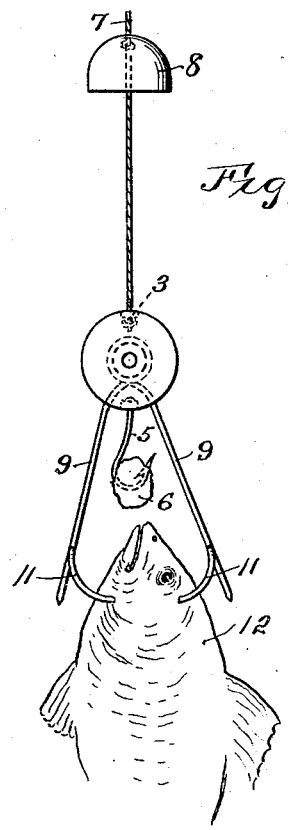
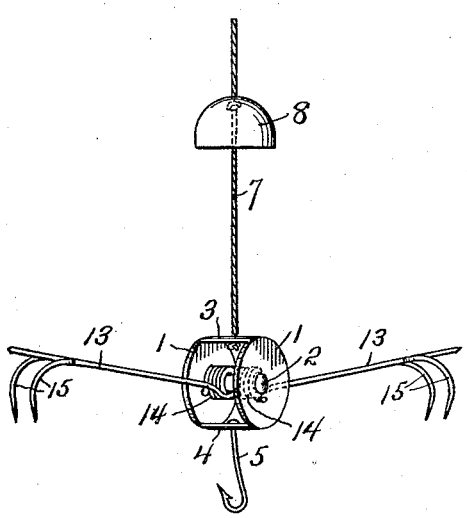
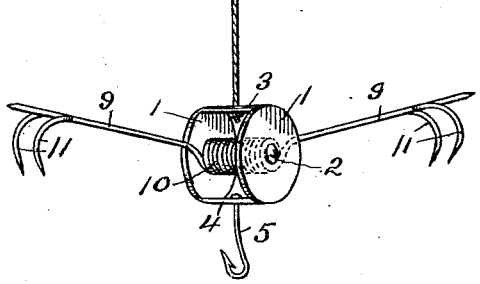

ROBERT E. WARD, OF KANSAS CITY, MISSOURI.

FISH-HOOK.

1,120,870. Specification of Letters Patent. Patented Dec. 15, 1914.

Application filed February 13, 1914. Serial No. 818,580.

*To all whom it may concern:*

Be it known that I, ROBERT E. WARD, a citizen of the United States, residing at Kansas City, in the county of Jackson and State of Missouri, have invented a certain new and useful Improvement in Fish-Hooks, of which the following is a specification.

My invention relates to improvements in fish hooks.

The object of my invention is to provide a fish hook by means of which the fish upon nibbling the bait will be seized and securely held.

A further object of my invention is to provide a fish hook which is cheap to manufacture, is reliable in operation, which is not liable to get out of order, and which is strong and durable.

The novel features of my invention are hereinafter fully described and claimed.

In the accompanying drawing which illustrates my invention, Figure 1 is a side elevation, partly broken away, of my improved fish hook shown in the set position Fig. 2 is a side elevation showing the hook in the closed position with a fish caught thereby. Fig. 3 is a perspective view of the preferred embodiment of my invention in which the two hook arms terminate in a coil spring common to both, the hook arms being shown partly closed. Fig. 4 is a perspective view of a modified form of my invention, shown in the partly open position, the two hook members terminating in separate springs.

Similar reference characters designate similar parts in the different views.

In each form of my invention, I provide a support comprising preferably a spool provided with two heads, 1, to which are respectively centrally secured the opposite ends of a transverse pin 2. Two transverse bars 3 and 4 are connected at their ends to the heads 1, said bars being located above and below the pin 2 in diametrically opposite positions. Secured to the bar 4 and extending downwardly therefrom is a hook 5, which is adapted to support bait 6, Fig. 2. A fish line 7 is secured at one end to the bar 3 and has secured to it a locking member 8, preferably cup-shaped.

In the form of my invention which is the preferred embodiment thereof, I provide a single member having two arms 9 which at their inner ends terminate in a coil spring 10, Fig. 3, which encircles the pin 2. Adjacent to the free ends of the arms 9 are one or more hooks 11 which, in the closed position shown in Fig. 2, curve inwardly below the bait hook 5 and are adapted to penetrate the head of a fish 12 when the fish nibbles at the bait 6.

In setting the hook, the arms 9 are forced to the upright position shown in Fig. 1, after which the cup-shaped locking member 8 is forced over the free outer ends of said hook arms, thereby holding them from being closed by the spring 10.

When the hook arms are in the set position shown in Fig. 1, the line 7, between its point of attachment to the locking member 8 and to the bar 3, will be slack, as shown in Fig. 1. The length of the line between these points is such that when the line is drawn taut, the hook arms 9 will be released from the locking member 8, after which the spring 10 will force said arms to the position shown in Fig. 2, the hooks 11 being forced into the fish which has been nibbling at the bait. Any effort of the fish to pull away will cause the hooks 11 to penetrate deeper, thus securely holding the fish. Preferably the hooks 11 are not provided with barbs so that they will more easily enter the flesh of the fish and will permit the removal of the fish from the hooks with little trouble.

In the form of my invention shown in Fig. 4, the hook members 13 are similar in construction to the hook arms 9 above described, with the exception that the inner ends of said members terminate in separate coil springs 14 mounted on the pin 2, the other ends of said springs being located in holes provided therefor in the heads 1 respectively. The hook members 13 adjacent to their outer ends are each provided with one or more hooks 15 corresponding in form, location and function to the hooks 11 already described.

In the operation of the modified form of my invention, shown in Fig. 4, the hook members 13 are swung to the vertical position and engage with the cup-shaped locking member 8 similar in location and function to the locking member already described. When the fish nibbles the bait on the hook 5, the support will be drawn downwardly thereby releasing the hook members 13 from the locking member 8, upon which the coil springs 14 will force the hook members 13 to the closed position in which the hooks 15 will catch the fish.

I do not limit my invention to the structures shown and described, as modifications, within the scope of the appended claims, may be made without departing from the spirit of my invention.

Having thus described my invention, what I claim and desire to secure by Letters Patent, is:—

1. In a fish hook, a support provided with a transverse rod, means for supporting bait on said support, a member having a hook at one end and provided with a spring mounted on said rod, a line attached to said support, and a locking device supported by said line and adapted to engage the free end of said hook member for holding the hook member in the open position against the tension of said spring, the length of the line between said support and said locking device being such that when drawn taut the locking device will be released from said hook member.

2. In a fish hook, a support provided with a transverse rod, a bait hook attached to said support, a member having a coil spring mounted on said rod and at one end having a hook, a line attached to said support, and a locking device supported by said line and adapted to engage the free end of said hook member for holding said member in the open position against the tension of said spring, the length of the line between the support and the locking device being such that when drawn taut, the locking device will be released from said hook member.

3. In a fish hook, a support provided with a transverse rod, bait supporting means attached to said support, a member provided with two arms and a coil spring intermediate of said arms, the coil spring being mounted on said rod, each of said arms having adjacent to its free end a hook, a line attached to said support, and a locking device carried by said line and adapted to releasably engage the free ends of said arms for holding them in the open position against the tension of said spring, the length of the line between said support and said locking device being such that, when the line is drawn taut, the locking device will be released from said arms.

4. In a fish hook, a support provided with a transverse pin, means for supporting bait on said support, a member having a spring mounted on said pin, said member adjacent to one end having a hook, a line attached to said support, and a cup-shaped locking member supported by said line and adapted to engage the hook member and hold it in the open position against the tension of said spring, the length of the line between the support and cup-shaped member being such that, when the line is drawn taut, the hook member will be released from the locking member.

5. In a fish hook, a support provided with a transverse pin, means for supporting bait on said support, a member provided with two arms and a coil spring intermediate of said arms, the coil spring encircling said pin, each of said arms having adjacent to its free end a hook adapted to coöperate with the other hook for holding a fish, a line attached to said support, and a cup-shaped locking member supported by said line and adapted to engage and hold said hook arms in the open position against the tension of said spring, the length of the line between the support and the cup-shaped locking member being such that, when the line is drawn taut, the hook arms will be released from said locking member.

6. In a fish hook, a spool having two heads and a pin connecting said heads, two bars connecting said heads at opposite sides respectively of said pin, a bait hook attached to one of said bars, a line attached to the other bar, a member provided with two arms and a coil spring intermediate of said arms and mounted on said pin, said arms adjacent to their free ends having hooks, and a cup-shaped locking member mounted on said line and adapted to releasably engage and hold said hook arms in the open position against the tension of said spring, the length of the line between the locking member and the bar to which it is attached being such that when the line is drawn taut, the locking member will be released from said hook arms.

In testimony whereof I have signed my name to this specification in presence of two subscribing witnesses.

ROBERT E. WARD.

Witnesses:
E. B. HOUSE,
WARREN D. HOUSE.

Copies of this patent may be obtained for five cents each, by addressing the "Commissioner of Patents, Washington, D. C."